Nov. 1, 1966   G. M. STANDAL   3,282,312
CHIPPER KNIFE AND APPARATUS
Original Filed May 27, 1960   7 Sheets-Sheet 1

INVENTOR.
GEORGE M. STANDAL
BY Wells & St.John
ATTYS.

Nov. 1, 1966  G. M. STANDAL  3,282,312
CHIPPER KNIFE AND APPARATUS
Original Filed May 27, 1960  7 Sheets-Sheet 2
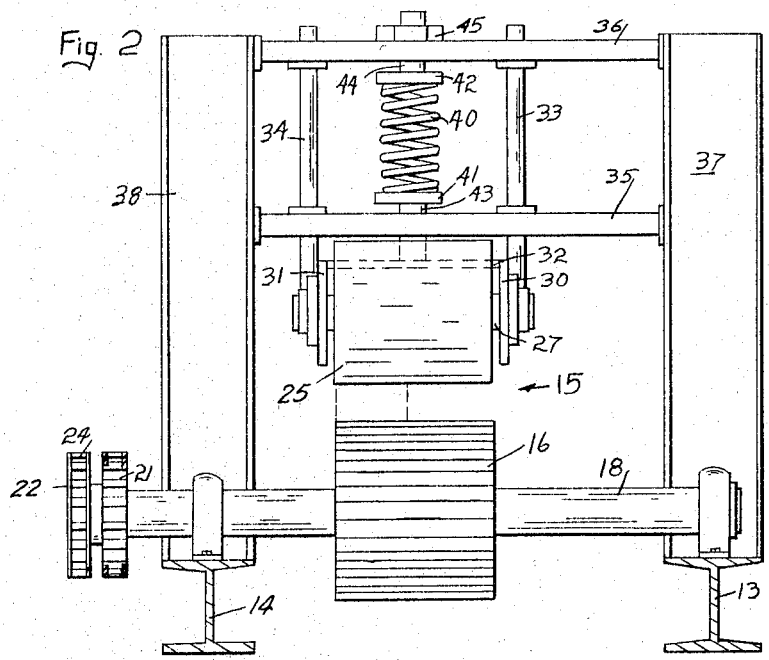
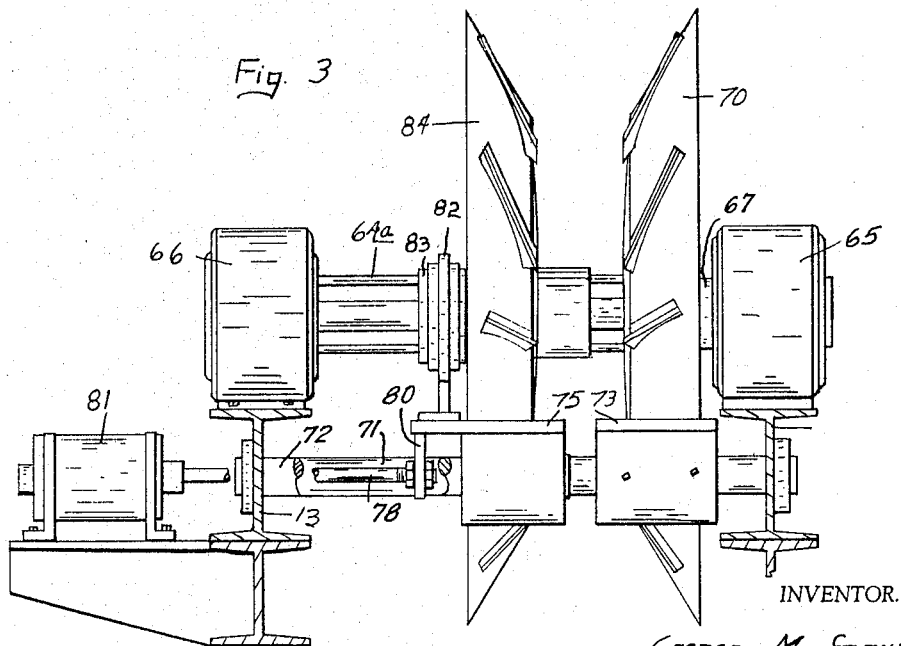
INVENTOR.
BY GEORGE M. STANDAL
*Wells & St. John*
Attys.

Nov. 1, 1966  G. M. STANDAL  3,282,312
CHIPPER KNIFE AND APPARATUS
Original Filed May 27, 1960  7 Sheets-Sheet 3
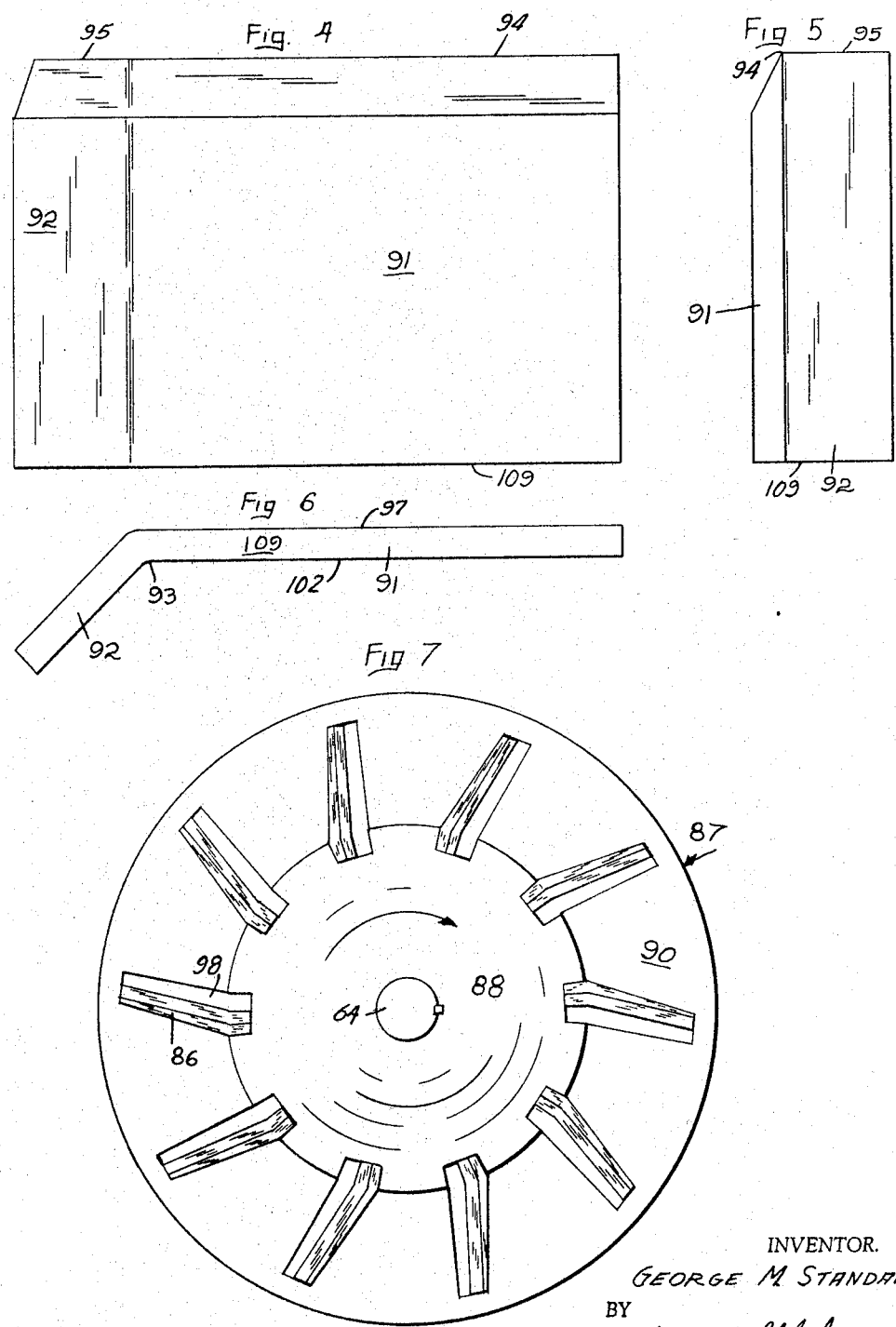
INVENTOR.
GEORGE M. STANDAL
BY
Attrs.

Nov. 1, 1966 G. M. STANDAL 3,282,312
CHIPPER KNIFE AND APPARATUS
Original Filed May 27, 1960 7 Sheets-Sheet 4
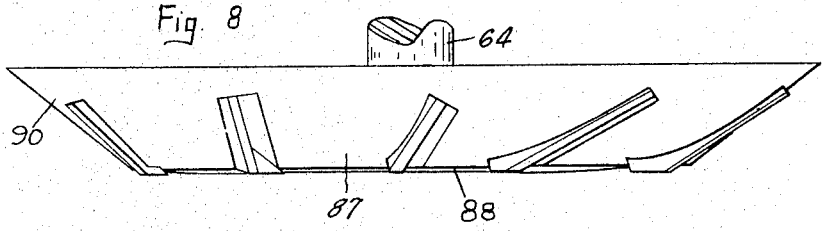
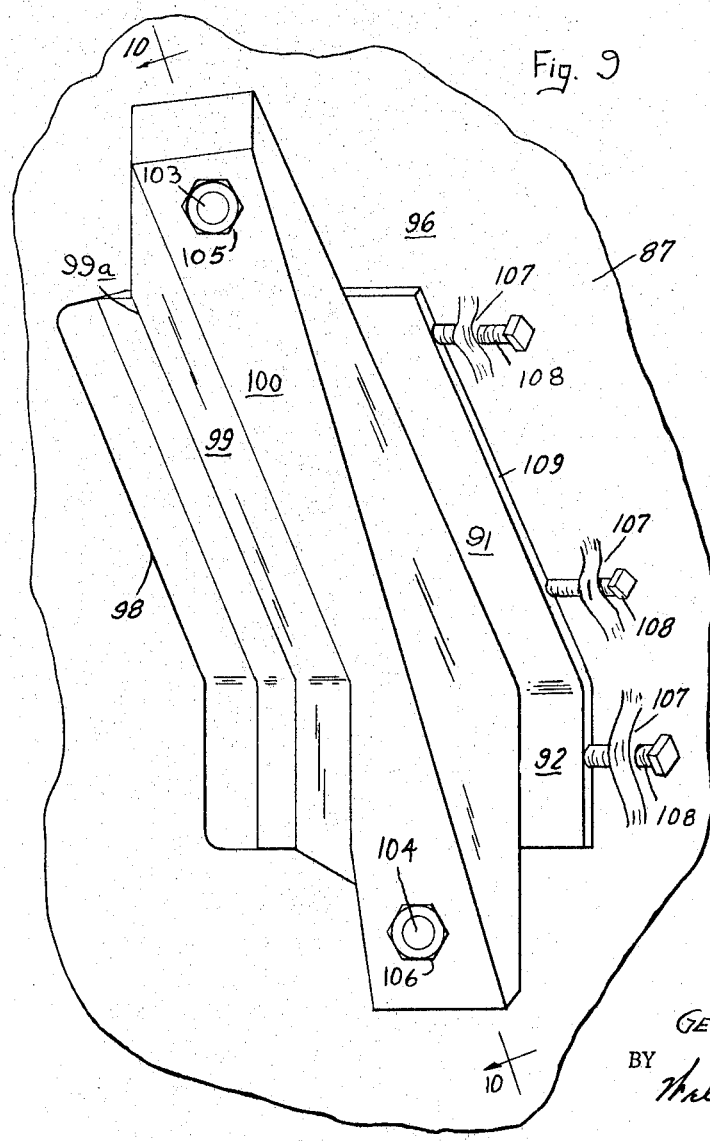
INVENTOR.
GEORGE M. STANDAL
BY
ATTYS.

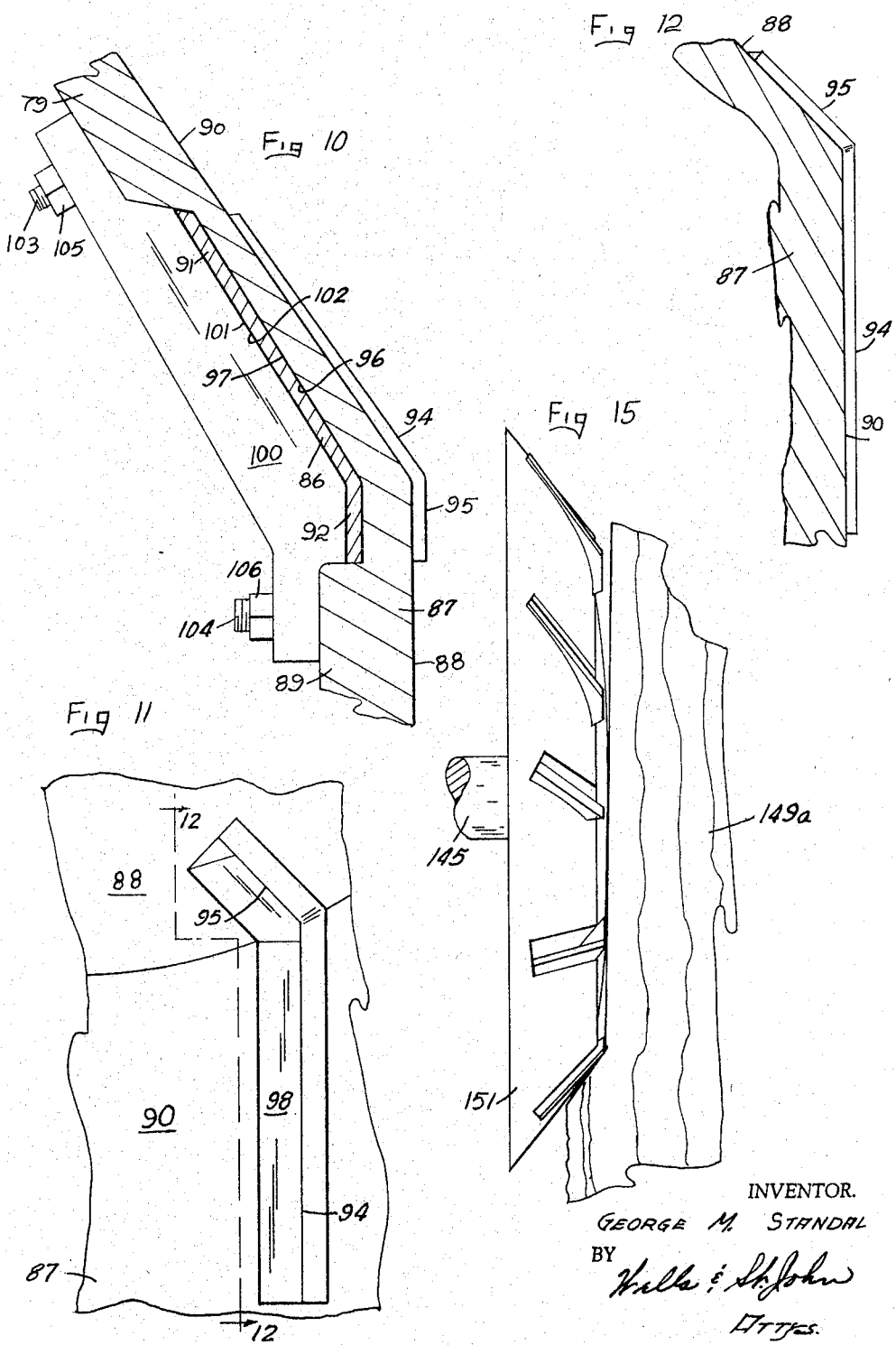

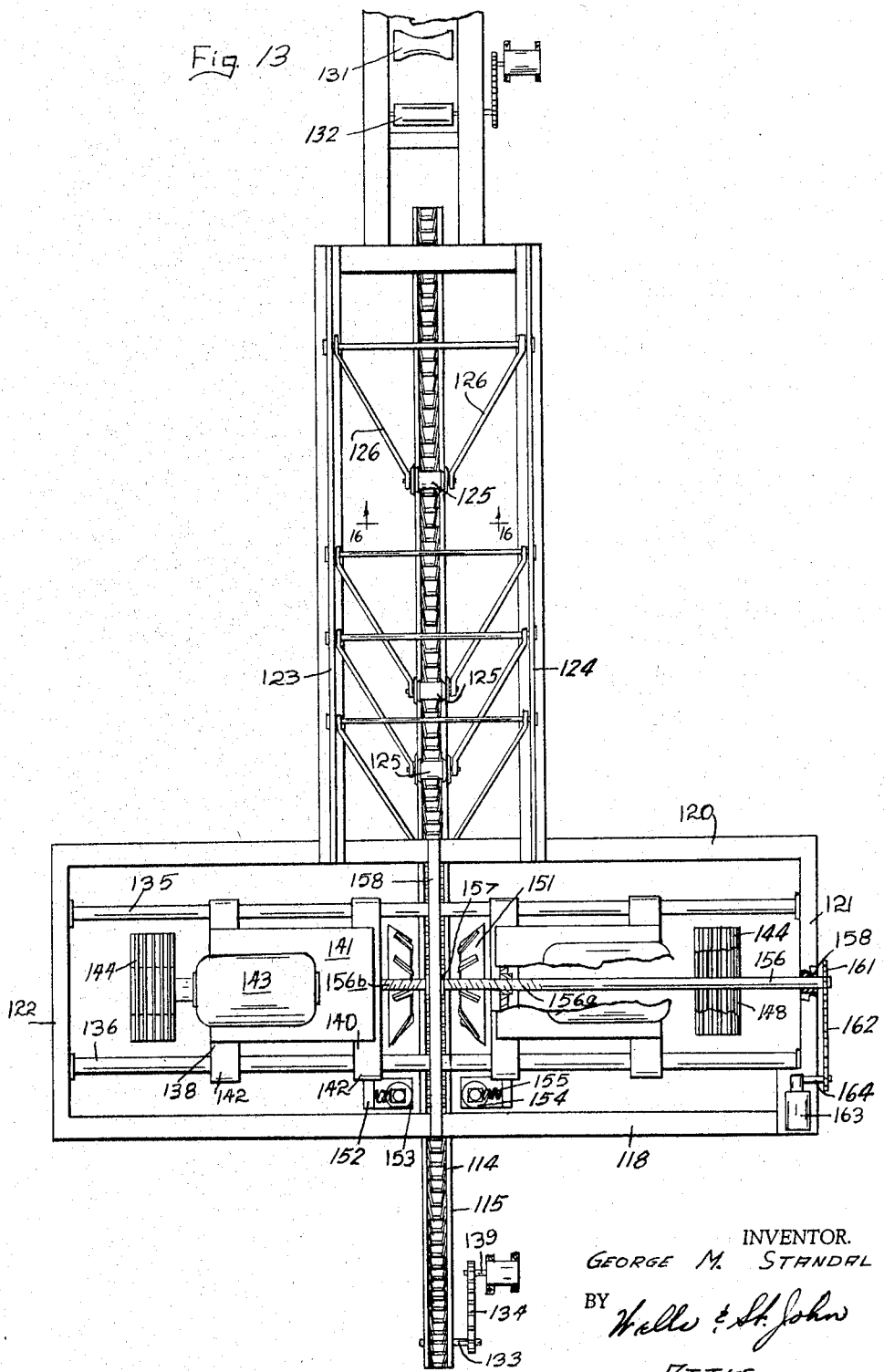

Nov. 1, 1966   G. M. STANDAL   3,282,312
CHIPPER KNIFE AND APPARATUS
Original Filed May 27, 1960   7 Sheets-Sheet 7
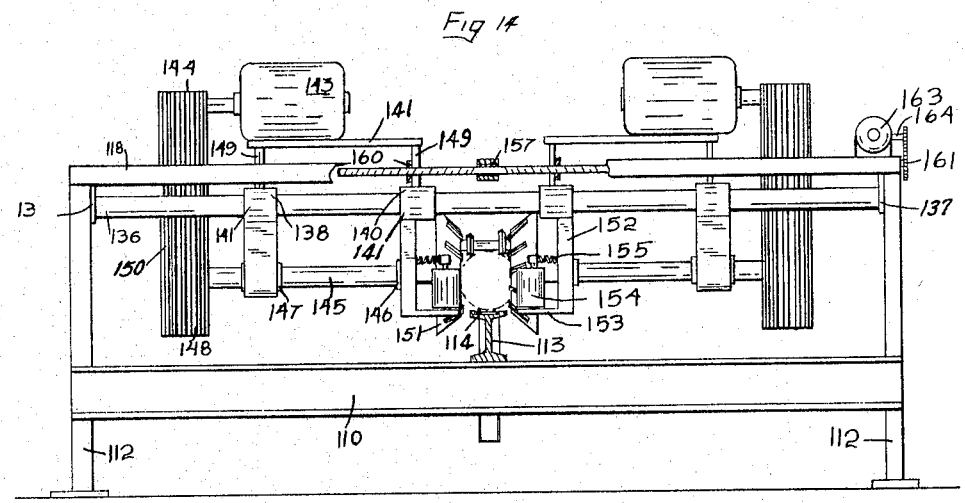
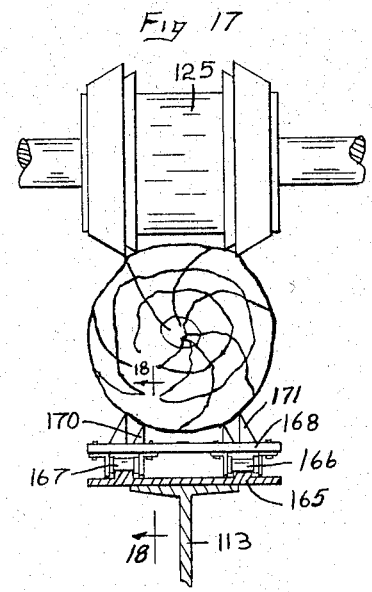
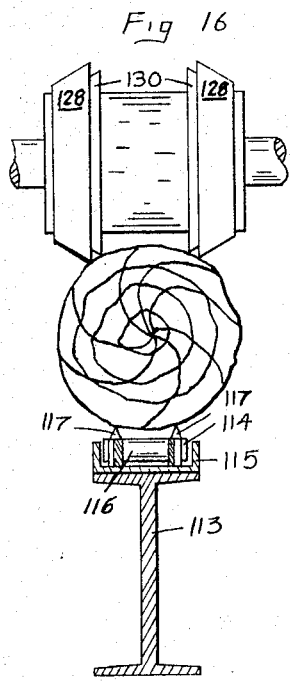
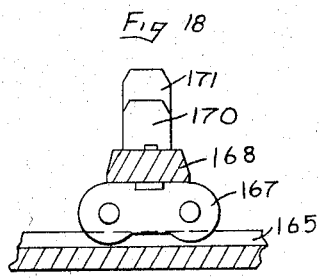
INVENTOR.
GEORGE M. STANDAL
BY
Wells & St. John
ATTYS.

United States Patent Office 3,282,312
Patented Nov. 1, 1966

3,282,312
CHIPPER KNIFE AND APPARATUS
George M. Standal, Chemainus,
British Columbia, Canada
Original application May 27, 1960, Ser. No. 32,346. Divided and this application Mar. 9, 1964, Ser. No. 350,368
6 Claims. (Cl. 144—220)

This is a division of copending application, Serial No. 32,346, filed by me on May 27, 1960, now Patent No. 3,190,326, for Gang Chipper for Logs.

This invention relates to a novel apparatus for squaring logs in preparation for sawmill processing. As described, it is also of use in removing unwanted wanes or rough edges from cut boards. These results are obtained according to the invention by the use of a chipper using a plurality of cutting heads.

In sawmill processing of logs, it is customary to square each log before cutting the conventional dimension lumber from it. According to present practice, the outer portion of the log is either planed or is cut by saws. Both of these methods result in large quantities of sawdust which is largely a waste product. The cut edgings removed by saws may be slashed into chips for pulp, but this requires additional steps and handling. Therefore it is now proposed to use a chipper to remove the rough edges of boards or logs. The chipper results in a smooth finished plane edge and removes the wood in the form of large chips which are usable in the production of wood pulp.

It is an object of this invention to produce usable wood chips from logs and wanes by means of a revolving cutter head having adjustable and replaceable cutting knives which combine a shearing and cutting action to produce a smooth finished edge and reclaimable wood chips.

It is a further object of this invention to provide a chipper having two cutter heads trimming waste from both sides of a board or log simultaneously. It is also an object of the invention to provide a highly adaptable chipper by making one or both cutting heads movable laterally so as to accommodate varying sizes of boards or logs.

These and further objects will be evident from a study of the following detailed description, which describes two embodiments of the invention. The first is designed for the removal of wanes from boards. The second is designed for the squaring of logs. Both embodiments are merely exemplary of possible forms within the scope of the invention, which is limited only as stated in the claims which follow the detailed descriptions.

In the drawings:

FIGURE 2 is a sectional view taken along line 2—2 in FIGURE 1;

FIGURE 3 is a sectional view of the cutter assembly taken along line 3—3 of FIGURE 1;

FIGURE 4 is a top view of a single knife;

FIGURE 5 is an end view of the knife taken from the right hand end in FIGURE 4;

FIGURE 6 is an end view of the knife taken from the lower end in FIGURE 4;

FIGURE 7 is a top view of the face of a single cutter head;

FIGURE 8 is a side view of the cutter head shown in FIGURE 7;

FIGURE 9 is an enlarged fragmentary view of a knife mounted in place, the view being a direct back view taken opposite to FIGURE 7;

FIGURE 10 is a fragmentary sectional view taken along line 10—10 in FIGURE 9;

FIGURE 11 is a fragmentary view of one knife mounted in place, the view being taken in a plane parallel to the long side cutting edge of the knife;

FIGURE 12 is a fragmentary sectional view taken along line 12—12 in FIGURE 11;

FIGURE 13 is a top plan view of a second embodiment of the invention;

FIGURE 14 is a rear end view of the machine taken from the lower end of FIGURE 13;

FIGURE 15 is a diagrammatic view of a single cutter head and a log as used in the second embodiment with exaggerated back clearance between the cutter head and log;

FIGURE 16 is an enlarged sectional view of the log conveyor taken substantially along line 16—16 in FIGURE 13;

FIGURE 17 is a view similar to FIGURE 16 showing a second type of log conveyor; and FIGURE 18 is a fragmentary view taken substantially along line 18—18 in FIGURE 17.

Figure 1:
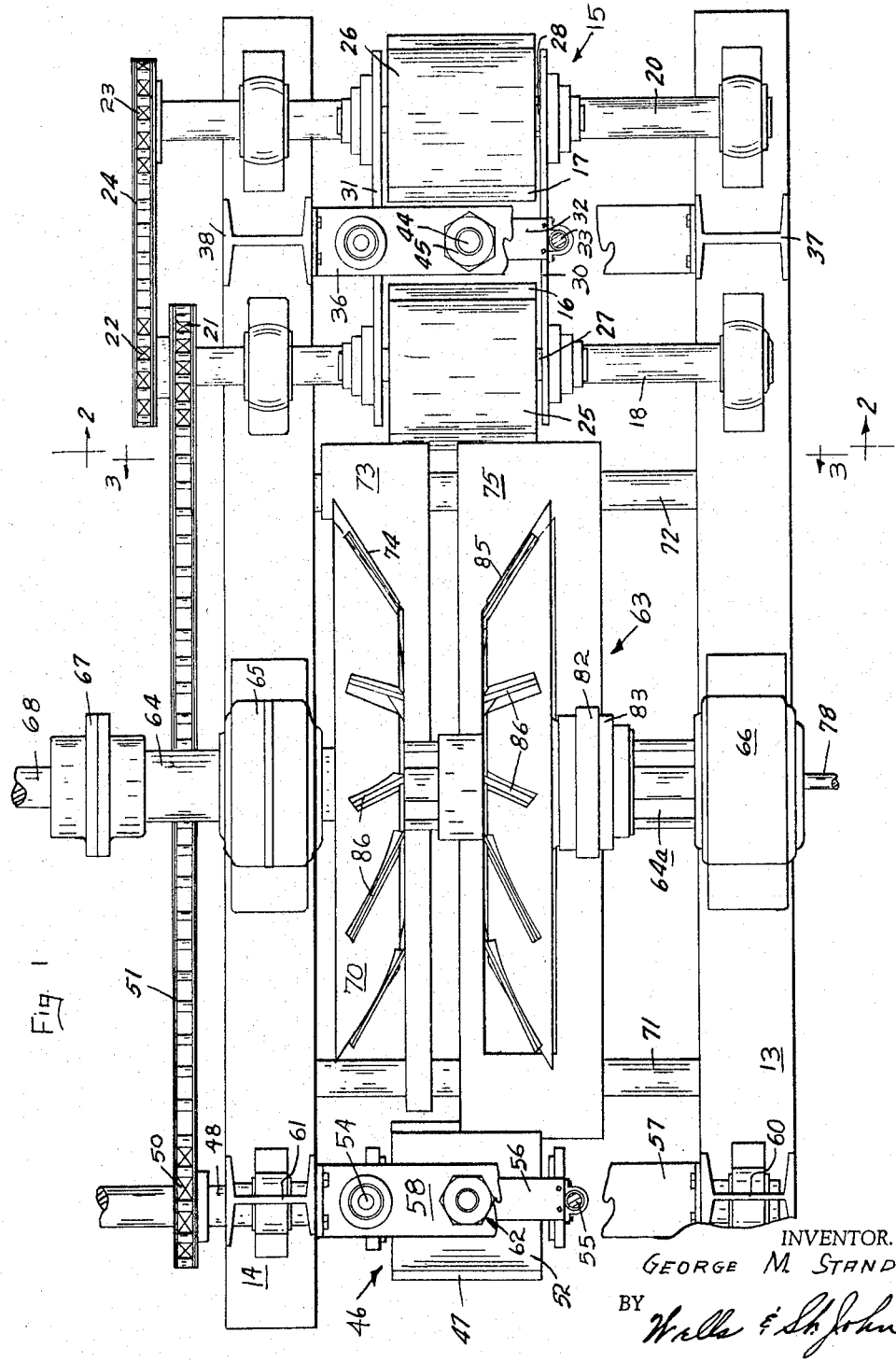
FIGURE 1 is a top plan view of a first embodiment of the invention with portions of the supporting framework broken away for clarity.

Referring now to the drawings, particularly FIGURES 1 to 3, this first embodiment of the invention is designed to remove wane from boards which have previously been cut along their top and bottom edges. The machine is designed to square the rough edges left on boards cut near the circumference of a log. The board may then be finally trimmed by a conventional planer before being used or sold.

The frame of the gang chipper consists of two longitudinal I-beams 13, 14 which may be supported in any desired manner so as to attain the required elevation. Mounted upon I-beams 13, 14 at the right hand end of the machine as seen in FIGURE 1, is a feed roller assembly generally designated as 15. Assembly 15 consists of two power rollers 16, 17 which are mounted between I-beams 13, 14 by means of suitable bearings which rotatably support shafts 18, 20 upon which rollers 16, 17 are respectively fixed. Shaft 18 extends beyond I-beam 14 and has sprockets 21, 22 fixed upon its outer end. Shaft 20 extends beyond I-beam 14 also and has mounted thereon a sprocket 23 longitudinally aligned with sprocket 22. A chain 24 connects sprockets 22 and 23. Each of the power rollers 16, 17 is corrugated so as to grip the lower edges of the boards without slipping.

Mounted directly above power rollers 16, 17 are two pressure rollers 25, 26 which press downwardly upon boards passing over the rollers 16, 17. Pressure rollers 25, 26 are mounted upon shafts 27, 28 respectively, which are journaled in bearings carried by two longitudinal support plates 30, 31. Plates 30, 31 are joined by a horizontal lateral plate 32, and two vertical guide rods 33, 34 are anchored at their lower ends to plates 30, 31 and extend upwardly therefrom. The guide rods 33, 34 extend through bearings mounted upon a pair of horizontal cross-members 35, 36 which are supported by two vertical I-beams 37, 38 fixed to I-beams 13, 14 respectively. A spring 40 is provided to supply necessary downward pressure to rollers 25, 26. Spring 40 is a large compression spring mounted by two caps 41, 42. Cap 41 is fixed to the upper end of a short shaft 43 which extends through an aperture cut through cross member 35 and is fixed at its lower end to the horizontal lateral plate 32. The upper cap 42 is fixed to a threaded shaft 44 which is threadably engaged in an aperture cut through cross member 36. The outer end of shaft 44 is threadably engaged by a lock nut 45. Thus it can be seen that spring 40 exerts a fixed amount of pressure upon rollers 25, 26 which may be varied by turning cap 42 and may be secured by adjustment of lock nut 45.

Mounted at the left hand side of the machine as seen in FIGURE 1 is an outfeed roller assembly generally designated as 46. This assembly is similar to assembly 15 except that it employs only one pair of rollers. A power roller 47 is fixed to a shaft 48 rotatably mounted in bearings located on the upper surfaces of I-beams 13, 14. Shaft 48 extends beyond the I-beam 14 and is adapted to be rotated by any desired power means (not shown). Fixed to shaft 48 is a sprocket 50 which is longitudinally aligned with sprocket 21. A chain 51 connects sprockets 50 and 21. Thus it can be seen that rotation of shaft 48 results in identical rotation of shafts 18 and 20.

A pressure roller 52 is mounted directly above power roller 47. Roller 52 is carried by a shaft rotatably journalled in bearings carried by vertical guide rods 54, 55. The guide rods 54, 55 are connected by a transverse plate 56. The guide rods 54, 55 extend through bearings mounted on cross members 57, 58 located between two vertical I-beams 60, 61 fixed above I-beams 13, 14. The transverse plate 56 has downward pressure exerted upon it by a spring assembly 62 identical in all respects to that described with respect to the feed roller assembly 15.

The chipper assembly is generally designated as 63 and is located between the feed roller assembly 15 and the outfeed roller assembly 46. An arbor 64 is rotatably supported by a first bearing assembly 65 mounted upon I-beam 14 and by a second bearing assembly 66 mounted upon I-beam 13. Arbor 64 extends beyond I-beam 14 and is connected at 67 to a drive shaft 68 which may be rotated by any desired means (not shown). A portion of arbor 64 designated as 64a is splined longitudinally. A first cutter head 70 is fixed to arbor 64 adjacent the I-beam 14. A pair of transverse horizontal guide rods 71, 72 are fixed between I-beams 13 and 14. Mounted below the center of cutter head 70 is a fixed anvil 73 whose upper surface is positioned at the same elevation as the top of rollers 16, 17 and 47. There is sufficient clearance between the top of fixed anvil 73 and the bottom of arbor 64 to allow boards to be accommodated during processing. Anvil 73 is cut away as shown at 74 so as to provide clearance for the lower portion of cutter head 70.

A second anvil 75 is slidably mounted upon guide rods 71, 72 by means of sliding bearings 76. This anvil 75 is movable transversely by means of a power shaft 78 which is attached to a depending ear 80 formed upon anvil 75. Shaft 78 extends beyond the frame of the machine and is adapted to be shifted longitudinally by any suitable power means generally shown at 81.

Mounted on the upper surface of anvil 75 is a bearing assembly 82. Bearing assembly 82 rotatably receives a collar 83 which is splined in mating relationship with section 64a of arbor 64. The collar 83 is longitudinally fixed by bearing assembly 82 so as to be positionable along arbor 64 by movement of anvil 75. A second cutter head 84 is fixed upon collar 83 so as to be positionable thereby. Anvil 75 is apertured at 85 to provide adequate clearance for the lower portion of cutter head 84. Cutter head 84 is formed as a mirror image of the cutter head 70. Thus it can be seen that two identical cutter heads are provided, head 70 being fixed in a transverse location, and head 84 being shiftable transversely by means of the power means 81.

Mounted upon cutter heads 84 and 70 are a plurality of knives 86. Since the structural details of the cutter heads 84 and 70 are identical and since each knife is identical, only a single knife 86 mounted on head 70 will now be described in detail.

As seen in FIGURES 7 and 8, the cutter head body 87 is cast in the general shape of a hollow truncated cone having a crowned surface 88 and a sloping circumferential outer surface 90 formed at 35 degrees with respect to surface 88. The back side of the body 87 is dished with a raised hub 89 and a raised outer rim 79. An aperture is cut through the center of hub 89 and is adapted to receive the arbor 64 or the shaft on which the cutter head is mounted. The crown 88 is very slight, but serves an important function in guiding the finished board edges past the cutter head 70. Ten knives are shown on cutter head 70 although this number may be varied depending upon the size of the work encountered and the speed required.

Each knife 86 consists of a rectangular side cutting blade 91 to which is joined a rectangular face cutting blade 92 (see FIGURES 4–6). The angle between these two blades 91 and 92 is preferably 45 degrees. The inner corner at this angle is denoted as 93 and is preferably rounded to provide a short radius fillet. The cutting edges 94, 95 of blades 91 and 92 are beveled on their outer surfaces, the edge angle preferably being 34 degrees. The knife 86 is machined from suitable high temper stock designed for the type of wear foreseen in each particular application.

The body 87 of the cutter head 70 has cast apertures located about the surfaces 88 and 90 and extending through these surfaces. Each aperture has a back surface 96 which is fashioned at such an angle as to receive the outer surface 97 of a knife 86 and to present the cutting edges 94, 95 substantially parallel to the surfaces 90 and 88 respectively. Each aperture also has a front surface 98 spaced a sufficient distance from the back surface 96 so as to provide a chip opening when a knife 86 is positioned in the aperture.

The knife 86 is clamped in place by a mounting block 100 having a clamping surface 101 formed to correspond to the configuration of the inner edge 102 of a knife 86. The block 100 is formed with a sloping surface 99 which terminates in an edge 99a that lies along the surfaces 88 and 90 when the block 100 is in place. Surface 99 is formed at an angle with respect to the clamping surface 101 so as to provide a wedging action against chips entering the chip opening between surface 98 and the knife. The outside surface of block 100 extends beyond the knife extremities and is apertured to receive two studs 103, 104 which are imbedded in hub 89 and rim 79. The studs 103, 104 threadably engage nuts 105, 106 respectively to thereby secure the block 100. The back surface 101 of the block 100 is enlarged to extend over a substantial area of blades 91 and 92 and insure frictional contact. Formed adjacent the inner end of the back surface 96 of the aperture are three raised ears 107 which have threaded holes cut through them in parallel axial relation to the back surface 96. Bolts 108 are threadably engaged through the ears 107 are serve to position the back or blunt edge 109 of the knife 86. Each knife 86 is mounted in the head 70 with the cutting edge 95 projecting about three eighths of an inch beyond the surface 88.

With this arrangement, the side cutting edge 94 is able to cut along the grain of the lumber being fed approximately three eighths of an inch—the projecting distance of edge 94 in a plane parallel to surface 90. The striking action of surface 99 tends to break up chips being cut. The cutting action of the side edge 94 is a gradual slicing action which insures the production of large, usable chips. The face cutting edge 95 also slices the lumber, since it comes in contact with the board in a plane below the disk axis. The length of cut along the grain of chips sliced from the lumber by edge 95 is dependent upon the feed of the machine. It is imperative for best efficiency that the power means for the feed and outfeed rollers be synchronized with the motor for arbor 64 so as to fed the lumber to the cutter heads 70 and 84 at approximately three-fourths of an inch per knife—or seven and one-half inches per revolution of arbor 64. In this manner every chip cut from the board will have a minimum fiber length of three-fourths of an inch and will be well suited for pulp production instead of being a waste product. It is important to note the smooth cutting action of the face cutting edge 95 which cuts the board along the grain in a finishing cut to produce an extremely smooth board edge. Another factor of importance is the fillet 93 which serves to insure a smooth chip with no broken "tail." Due to the position of knife 86 in the cutter heads, the outer portions of edges 94, 95 will strike the lumber first. The edges 94, 95 will then slice off chips, the final cutting action occurring at fillet 93. By slightly rounding this fillet, the corner blow is softened into a gradual smooth cut, thus producing uniform high quality chips without tearing any fiber from the finished board edge.

In this first embodiment the cutter heads 70 and 84 are opposed and parallel. The returning knives serve as planing knives to produce accurate, smooth board edges.

FIGURES 13 and 14 show the second embodiment of the invention, which is a machine particularly adapted to the squaring of rough logs. It must be understood however, that either of the two embodiments shown could function equally as well for boards or logs by merely redesigning the configuration of the feed means. The cutter head configurations are adaptable to either application.

The machine as shown consists of a main cross frame composed of I-beams 110. These I-beams 110 are supported on vertical legs 112. Mounted longitudinally across the centers of I-beams 110 is an I-beam 113 which supports the feed chain 114. Chain 114 is a wide single link chain which rides along a channel 115 fixed to the upper surface of the I-beam 113. Alternate rollers 116 in chain 114 have formed thereon a pair of projecting points 117 adapted to grip the lower surface of logs being fed into the machine.

The legs 112 also have mounted thereon an upper frame consisting of a rear angle iron 118, a front angle iron 120 and two side angle irons 121, 122. A pair of forwardly extending supports 123, 124 extend from the front angle iron 120 and have their forward ends suitably supported on the mill floor. These supports 123, 124 pivotally carry a series of pressure rollers 125 which are mounted on struts 126 journalled on shafts 127. Each roller 125 is formed with two outer disks 128 for large logs and two inner disks 130 for smaller logs. Disks 128, 130 are sharply edged so as to grip logs by the weight of rollers 125 and serve to prevent the logs from tipping.

Suitably mounted forward of the machine are a concave feed roller 131 and a cutting roller 132 having lateral blades adapted to remove any projections from the lower log surface before it enters the machine.

The chain 114 is suitably mounted on sprockets. As shown, the rear sprocket is mounted on a shaft 133 driven by a chain 134, which in turn is rotated by shaft 139 which may be powered by any suitable motor means.

Two transverse guide rods 135, 136 are suspended from the side angle irons 121, 122 by means of ears 137. These rods 135, 136 slidably mount the cutter head apparatus. Since the two cutter head assemblies are mirror images of one another, only one will be described, with identical numerals being used in the drawings to designate both.

A pair of cross supports 138, 140 are mounted upon the rods 135, 136 by means of bearings 142. Mounted above cross supports 138, 140 is a table 141 supported by four legs 149 fixed to the cross supports 138, 140. The table 141 is positioned above the upper frame and has mounted thereon a motor 143 which drives a multiple pulley 144.

Depending downward from cross supports 138, 140 are two bearings for the cutter head shaft 145—the inside bearing 146 and the outside bearing 147. The outer end of shaft 145 is capped by a multiple pulley 148 which is operatively connected to pulley 144 by means of belts 150. The inner end of shaft 145 has fixed thereon a cutter head 151 identical to those previously described.

The rear end of cross support 138 has fixed to it a depending brace 152 which supports a horizontal plate 153. Plate 153 rotatably mounts a pressure roller 154 whose inner edge is aligned with the crown of the cutter head 151. The upper end of roller 154 is yieldably supported by means of a compression spring 155. The rollers 154 cooperate with the crowns of cutter heads 151 to support the finished edges of the log in a vertical relationship.

It is important to note that the inside bearing 146 is mounted slightly forward with respect to the outside bearing 147. The results in the shaft 145 being slightly displaced from a line perpendicular to the log being fed. The object of this relationship is to provide clearance for the returning knives on cutter head 151 so that only the forward knives cut the log. Therefore the log edges are cut and finished by the forward knives, and guided by the crown of head 151 and then by the rollers 154 in progressive relation. The relationship is best seen in FIGURE 15 showing a log 149a being cut by head 151.

In order to laterally move the cutter heads 151, a control shaft 156 is rotatably journaled in a central bearing 157 carried by a brace 158 and also in a side bearing 159 mounted in the side angle iron 121. The centrally located portions 156a and 156b of the shaft 156 are threaded with oppositely-oriented threads received by threaded apertures cut through ears 160 formed upwardly from tables 141. The outside end of shaft 156 has fixed thereon a spocket 161 which is diven by a chain 162 that is controlled by a motor 163 and drive shaft 164. By rotating the control shaft 156 in the desired direction, the spacing of cutter heads 151 may be varied depending upon the logs being accommodated.

FIGURES 17 and 18 show a power chain arrangement which may be substituted in the feeding apparatus of this embodiment. The chain apparatus is shown mounted on a double channel 165 fixed to the top surface of I-beam 113. This double channel 165 slidably guides a pair of link roller chains 166, 167 which have mounted thereon a plurality of spaced bars 168. Bars 168 are provided with two pairs of upwardly extending teeth 170, 171. The inner teeth 170 being particularly adapted to grip small diameter logs and the outer teeth 170 being enabled to grip large diameter logs. This arrangement is used with previously described roller 125. Due to the width of the bars 168, this arrangement is suitable only for feed purposes—the previously described narrow chain arrangement being most suitable in the vicinity of the cutter heads and on the outfeed table.

The operation of this embodiment is quite obvious and is analogous to that described with respect to FIGURES 1 to 3. The log leaving the machine will have smooth vertical sides and the chips produced will be usable for pulp.

If squaring of all four sides is desired, the log may then be processed in a machine such as shown in FIGURES 1 to 3 which will not mar its finished edges or may be turned 90 degrees and re-run through the machine shown in FIGURES 13 and 14. Another alternative is to place two additional cutting heads in opposed horizontal positions directly before or after heads 151 to square the log in a single operation.

Various modifications will be seen to be obvious to one skilled in this art, particularly in the mounting of the cutter heads. Obviously, the two forms shown are merely examples of the manner in which this invention may be put to use to provide efficient edging of boards or logs with useful by-product chips being produced for pulp. The specific angles of the cutting heads and knives may be varied, depending upon the nature of the wood to be cut. By forming the knife at a smaller angle, a longer slicing action is achieved. If the angle is enlarged, the knife will strike harder, with a shearing action.

The invention described herein is therefore defined only in the following claims.

Having thus described my invention, I claim:

1. A knife adapted to be mounted on a cutting head, comprising a first rectangular blade portion having a beveled cutting edge along one boundary, a second blade portion formed integrally with said first blade portion at an angle thereto along a side of said first portion which is perpendicular to its cutting edge, the inside angle between the said first and second blade portions being greater than 90°, said second blade portion including a beveled edge along one boundary which intersects the beveled edge of the first blade portion to form a continuous cutting edge along one end of the knife, the respective cutting edges of said first and second blade portions terminating in a single plane.

2. The combination with a cutting head having a face surface and an angular side surface intersecting said face surface and extending outwardly therefrom, the periphery of said face surface and side surface being provided with a plurality of angular openings intersecting at the joinder thereof; of a plurality of knives mounted individually within each of said openings, comprising a first blade portion having a straight beveled cutting edge, a second blade portion formed integrally with said first blade portion at an angle thereto and having a straight beveled cutting edge intersecting the beveled edge of said first blade portion, the beveled edges of the two portions terminating in a single plane which is perpendicular to both of said portions, and mounting means clamped to the cutting head adapted to hold the knives in place with said beveled edges projecting beyond the surfaces of the crowned face and conical sides.

3. The invention as defined in claim 2 wherein said openings in the cutting head are wider than the thickness of the blade portions of the knives, said knives being mounted at the back surfaces of said openings with respect to the direction of rotation of said cutting head, the area between the knives and the front surfaces of said openings constituting chip openings adapted to receive wood chips cut from stock by the rotating knives.

4. The combination with a cutting head having a face surface and an angular side surface intersecting said face surface and extending outwardly therefrom, the periphery of said face surface and side surface being provided with a plurality of angular openings intersecting at the joinder thereof;

of a plurality of knives mounted individually within said openings, each knife comprising a first blade portion having a straight beveled cutting edge, a second blade portion formed integrally with said first blade portion at an angle thereto and having a straight beveled cutting edge intersecting the beveled cutting edge of first blade portion, the beveled cutting edges of the two portions terminating in a single plane and being located outwardly adjacent to the face surface and side surface of the cutting head respectively, and mounting means operatively connected between the cutting head and each of said knives to fix the position of each knife relative to said cutting head.

5. The invention as defined in claim 4 wherein each knife is positioned on said cutting head with the outer end of the beveled cutting edge adjacent to the cutting head side surface leading the other end of the beveled cutting edge adjacent to the cutting face surface in the intended direction of movement of the knife on the cutting head.

6. The invention as defined in claim 4 wherein said openings in the cutting head are wider than the thickness of the blade portions of the knives respectively, said knives being mounted at the back surfaces of said openings with respect to the direction of rotation of said cutting head, the area between the knives and the front surfaces of said openings constituting chip openings adapted to receive wood chips cut from stock by the rotating knives.

References Cited by the Examiner
UNITED STATES PATENTS

| | | | |
|---|---|---|---|
| 1,315,734 | 9/1919 | Mattison | 144—235 |
| 2,884,031 | 4/1959 | Standal | 144—114 |

WILLIAM W. DYER, Jr., *Primary Examiner.*

W. D. BRAY, *Assistant Examiner.*